(12) United States Patent
Lee et al.

(10) Patent No.: US 10,293,590 B2
(45) Date of Patent: May 21, 2019

(54) METHOD AND APPARATUS FOR CONTINUOUSLY MANUFACTURING DISPLAY UNIT

(71) Applicant: LG CHEM, LTD., Seoul (KR)

(72) Inventors: Beom Seok Lee, Daejeon (KR); Suk Jae Lee, Daejeon (KR); Kyung Hyeok Park, Daejeon (KR); San Park, Daejeon (KR); Hang Suk Choi, Daejeon (KR); Eung Jin Jang, Daejeon (KR); Bong Su Jeung, Daejeon (KR); Jea Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 10 days.

(21) Appl. No.: 15/605,366

(22) Filed: May 25, 2017

(65) Prior Publication Data

US 2017/0341361 A1     Nov. 30, 2017

(30) Foreign Application Priority Data

May 30, 2016   (KR) .................. 10-2016-0066195

(51) Int. Cl.

| | |
|---|---|
| *B32B 41/00* | (2006.01) |
| *B32B 38/10* | (2006.01) |
| *B32B 38/00* | (2006.01) |
| *G02B 5/30* | (2006.01) |
| *B32B 37/12* | (2006.01) |

(52) U.S. Cl.
CPC .............. *B32B 38/10* (2013.01); *B32B 37/12* (2013.01); *B32B 38/0004* (2013.01); *B32B 41/00* (2013.01); *G02B 5/3033* (2013.01); *B32B 2041/04* (2013.01); *B32B 2307/42* (2013.01); *B32B 2457/20* (2013.01)

(58) Field of Classification Search
CPC ..... B32B 38/10; B32B 38/0004; B32B 41/00; B32B 2307/42; G02B 5/3033
USPC .................... 156/64, 350, 351, 378, 379
See application file for complete search history.

(56) References Cited

U.S. PATENT DOCUMENTS

2010/0288420 A1* 11/2010 Kimura ............... B32B 38/1841
156/64

\* cited by examiner

*Primary Examiner* — Michael N Orlando
*Assistant Examiner* — Joshel Rivera
(74) *Attorney, Agent, or Firm* — Dentons US LLP

(57) ABSTRACT

A method of continuously manufacturing a display unit according to an exemplary embodiment of the present invention, which bonds sheet pieces of a polarizing film formed by cutting a roll-type optical film into sheet pieces having a predetermined sheet pieces to a panel to manufacture the display unit, continuously carries an optical film, detects a defect of the optical film, extracts a defective area based on information on the detected defect, forms a slit line in a horizontal direction with respect to a carrying direction of the optical film based on the defective area, determines whether the sheet piece of the polarizing film divided by the slit line is a defective sheet piece or a normal sheet piece, peels the sheet piece determined as a normal sheet piece from a release film, and bonds the normal sheet piece and a panel.

17 Claims, 8 Drawing Sheets

METHOD AND APPARATUS FOR CONTINUOUSLY MANUFACTURING DISPLAY UNIT

This application claims the benefit of Korean Patent Application No. 10-2016-0066195 filed on May 30, 2016, the contents of which are incorporated herein by reference in their entirety for all purposes as if fully set forth below.

TECHNICAL FIELD

The present invention relates to a method and an apparatus for continuously manufacturing a display unit, and more particularly, to a method and an apparatus for continuously manufacturing a display unit, which extract a defective area based on defects detected from n unit examination areas formed in an optical film, form a polarizing film sheet piece having no defective area, and bond the polarizing film sheet piece to a panel.

BACKGROUND ART

A display unit is manufactured by bonding a polarizing film that is an optical functional film generally called a polarizing plate to each of an upper surface (viewing side) and a lower surface (backlight side) of a panel formed of a liquid crystal layer, which is interposed between rectangular glass substrates and on which a transparent electrode, a color filter, and the like, are disposed, in a form of sheet pieces.

In order to continuously manufacture a display unit by using a roll-type optical film including a polarizing film including an adhesive layer, and a release film adhering to the adhesive layer so as to be peeled off, continuous slit lines are formed in the supplied optical film, and polarizing film sheet pieces formed by the slit lines are peeled from the release film and bonded to the panel.

An important technical object in manufacturing the display unit is to confirm a defect of the manufactured display unit in advance and prevent an incurrence of a defective product. Accordingly, it is possible to remarkably improve the yield of the manufacturing the display unit. A considerable number of defects are mainly caused by a defect existing in the polarizing film included in an optical film laminated structure, and it is difficult to provide an optical film laminated structure in a state where the defects included in the respective laminated films are completely removed. According to the investigation of all of a polarizer forming the polarizing film, a protective film laminated on the polarizer, and the adhesive layer formed in the polarizing film, it has been revealed that various forms of 20 to 200 defects per 1,000 m of the polarizing film, which includes defects existing in a PVA film itself of the polarizer, defects generated when the protective film is laminated on the polarizer, and defects generated in the adhesive layer of the polarizing film, are distributed. This represents that it is currently extremely difficult to manufacture the polarizing film having no defect.

In order to improve a yield of the manufacturing the display unit, sheet pieces (hereinafter, referred to as the normal sheet piece) of normal products are cut by adequately avoiding an area including a defect in the optical film laminated structure, and the sheet pieces are bonded to the panel. Further, the area including the defect in the optical film laminated structure is a sheet piece (hereinafter, referred to as the defective sheet piece) of a defective product, and the corresponding area is cut, but is processed to be excluded in a subsequent process.

Accordingly, there is required a method of continuously manufacturing a display unit, which is capable of bonding only the sheet piece determined as the normal sheet piece to the panel even without a stop of the supply of the optical film by providing a means, which prevents the sheet piece determined as the defective sheet piece from being bonded to the panel, between the normal sheet piece and the defective sheet piece of the polarizing film, which are sequentially formed on the release film in a cut state.

Korean Patent Application Laid-Open No. 10-2015-0121004 (hereinafter, Patent Document 1) suggests a system for producing an optical display device. The Patent Document confirms a position of a mark assigned to an optical film and determines a forming position of a cutting line based on the confirmed position of the mark, so that it is difficult to apply the Patent Document to a process of carrying the optical film in the unit of a pitch.

RELATED ART LITERATURE

Patent Document

Patent Document 1: Korean Patent Application Laid-Open No. 10-2015-0121004

DETAILED DESCRIPTION OF THE INVENTION

Technical Problem

The technical object to be accomplished by the present invention is to provide a method and an apparatus for continuously manufacturing a display unit, which are capable of improving a yield of a display unit.

Technical Solution

An exemplary embodiment of the present invention provides a method of continuously manufacturing a display unit, wherein the method bonds a polarizing film sheet piece to a panel to manufacture the display unit, wherein the polarizing film sheet piece is formed in a predetermined length by cutting a roll-type optical film, the optical film including a polarizing film having an adhesive layer, and a release film which adheres to the adhesive layer so as to be peeled therefrom, the method comprising: continuously carrying the optical film to a cutting position; detecting a defect of the optical film before the optical film is carried to the cutting position; extracting a defective area based on the detected defect among n unit examination areas, which are formed by dividing a distance corresponding to a length of the sheet piece from a first slit line forming position formed in the optical film into n equal parts (n>1); determining a position, at which a second slit line traversing the optical film in an orthogonal direction with respect to a carrying direction of the optical film is to be formed, based on the extracted defective area and the first slit line forming position; forming a second slit line from an opposite side to the release film to a depth reaching a surface of the adhesive layer side of the release film at the cutting position, based on the position, at which the second slit line is to be formed; deciding on whether the optical film sheet piece defined by the first slit line and the second slit line is a defective sheet piece including the defective area or a normal sheet piece including no defective area; peeling from the release film the normal sheet piece decided in said deciding; and supplying the panel to a bonding position so that a position of the panel is aligned with the normal sheet piece carried to the bonding position, and bonding the normal sheet piece and the panel.

When at least one area among the n unit examination areas are extracted as the defective areas in the extracting a defective area, a boundary line at an upstream side of the extracted defective area is determined as the position, at which the second slit line needs to be formed.

When the defective area is not extracted in the n unit examination areas in the extracting a defective area, a boundary line at an upstream side of the unit examination area existing at an upstream side of a carrying direction of the optical film is determined as the position, at which the second slit line needs to be formed.

When the second slit line is formed on the optical film based on the position, at which the second slit line needs to be formed, the second slit line formed in the optical film is set as a new first slit line, and a position, at which a new second slit line needs to be formed, is determined based on the new first slit line.

In the detecting a defect, the defect is identified by obtaining a difference in a light intensity between reflective light, which is reflected from the defect and enters a light detecting device, or transmitted light, which passes through the defect and enters the light detecting device, in light emitted from the light source to the optical film, and reflective light, which is reflected from a portion other than the defect and enters the light detecting device, or transmitted light, which passes through a portion other than the defect and enters the light detecting device, in light emitted from the light source to the optical film.

In the extracting of a defective area, the defective area is extracted as the unit examination area violating a predetermined reference condition as the defective area.

The reference condition is at least one of the existence of the defect, a size of defect, the number of defects.

A length of a single area among the n unit examination areas is 10 to 2,500 mm.

The number n of unit examination areas, which are formed by dividing a distance corresponding to a length of a long side of the normal sheet piece from the first slit line forming position formed in the optical film bonded to one surface of the panel into n equal parts (n>1) is different from the number m of unit examination areas, which are formed by dividing a distance corresponding to a length of a short side of the normal sheet piece from the first slit line forming position formed in the optical film bonded to the other surface of the panel into m equal parts (m>1).

A length of a single area among the n unit examination areas, which are formed by dividing the distance corresponding to the length of the long side of the normal sheet piece from the first slit line forming position formed in the optical film bonded to one surface of the panel into n equal parts (n>1) is equal to a length of a single area among the m unit examination areas, which are formed by dividing a distance corresponding to the length of the short side of the normal sheet piece from the first slit line forming position formed in the optical film bonded to the other surface of the panel into m equal parts (m>1).

The method may further include preventing the defective sheet piece decided in said deciding from being bonded to the panel.

In the preventing of the defective sheet from being bonded to the panel, when the defective sheet piece formed on the optical film reaches an exclusion position, the defective sheet piece is excluded from the carrying path of the optical film by shifting a portion of the optical film including the defective sheet piece to a dummy film carrying path and bonding the defective sheet piece to the dummy film carrying path.

In the preventing of the defective sheet from being bonded to the panel, when the defective sheet piece formed on the optical film reaches a bonding position, the defective sheet piece is excluded from the carrying path of the optical film by transmitting the dummy film carrying path to the bonding position, bonding the defective sheet piece to the dummy film carrying path.

Another exemplary embodiment of the present invention provides an apparatus for continuously manufacturing a display unit, which bonds polarizing film sheet pieces formed by cutting a roll-type optical film including a polarizing film including an adhesive layer, and a release film adhering to the adhesive layer so as to be peeled off into sheet pieces having a predetermined length to a panel to manufacture the display unit, the apparatus including: a carrying device, which continuously carries the optical film to a cutting position; a defect detecting device, which detects a defect of the optical film before the optical film is carried to the cutting position; a defective area extracting means, which extracts a defective area based on the detected defect among n unit examination areas, which are formed by dividing a distance corresponding to a length of the sheet piece from a first slit line forming position formed in the optical film into n equal parts (n>1); a slit line forming position calculating means, which determines a position, at which a second slit line traversing the optical film in an orthogonal direction with respect to a carrying direction of the optical film needs to be formed, based on the extracted defective area and the first slit line forming position; a slit line forming device, which forms a second slit line from an opposite side to the release film to a depth reaching a surface of the adhesive layer side of the release film at the cutting position, based on the position, at which the second slit line needs to be formed; a control means, which determines whether the sheet piece of the optical film divided by the first slit line and the second slit line is a defective sheet piece including the defective area or a normal sheet piece including no defective area; a peeling device, which peels the normal sheet piece determined by the control means from the release film; and a bonding device, which supplies a panel to a bonding position so that a position of the panel is accorded with the normal sheet piece carried to the bonding position, and bonds the normal sheet piece and the panel.

When at least one areas among the n unit examination areas are extracted as the defective areas by the defective area extracting means, the slit line forming position calculating means determines a boundary line at an upstream side of the extracted defective area as the position, at which the second slit line needs to be formed.

When the defective area is not extracted in the n unit examination areas by the defective area extracting means, the slit line forming position calculating means determines a boundary line at an upstream side of the unit examination area existing at an upstream side of a carrying direction of the optical film as the position, at which the second slit line needs to be formed.

The defect detecting device includes a light source, a light detecting device disposed at the same side as a side of the light source of the optical film or disposed at an opposite side to the light source, and a control device receiving information from the light detecting device, and the control device identifies the defect by obtaining a difference in a light intensity between reflective light, which is reflected from the defect and enters the light detecting device, or transmitted light, which passes through the defect and enters the light detecting device, in light emitted from the light source to the optical film, and reflective light, which is reflected from a portion other than the defect and enters the light detecting device, or transmitted light, which passes through a portion other than the defect and enters the light detecting device, in light emitted from the light source to the optical film.

Advantageous Effects

According to the method of continuously manufacturing the display unit according to the exemplary embodiment of the present invention, it is possible to improve a yield of the display unit by excluding a defective sheet piece, and increase a manufacturing speed of the display unit, thereby improving productivity of the display unit.

BEST MODE

Figure 1:
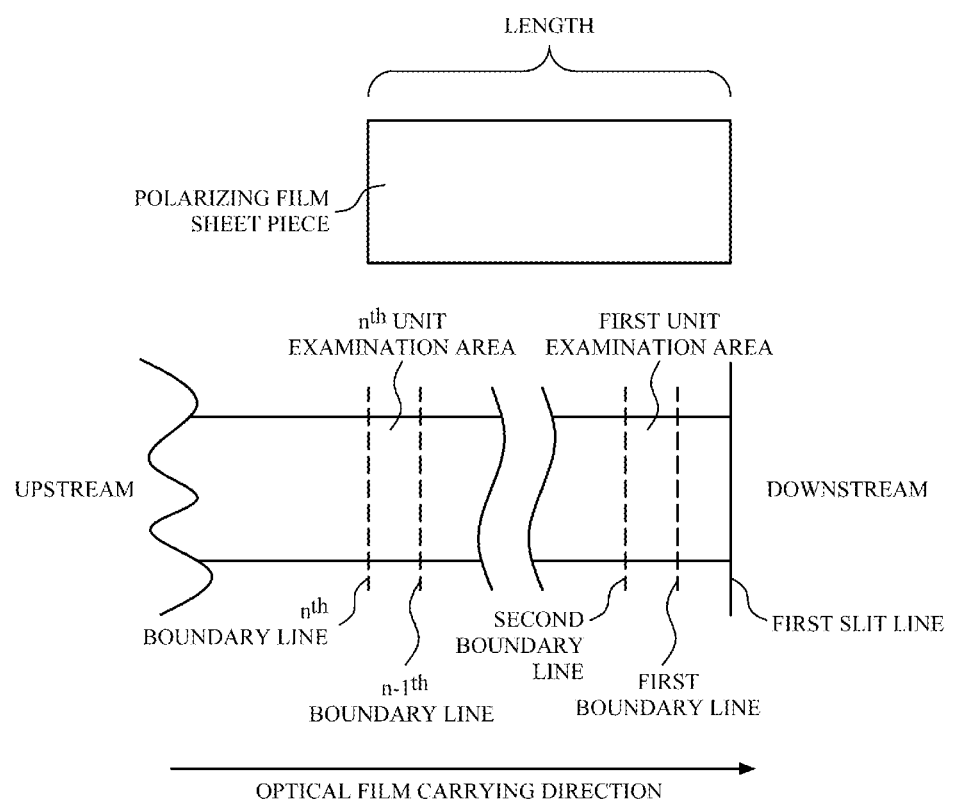
FIG. 1 is a diagram illustrating an optical film, in which n unit examination areas are formed, according to an exemplary embodiment of the present invention.

Hereinafter, the exemplary embodiments of the present invention will be described more fully with reference to the accompanying drawings so that those skilled in the art can easily carry out the present invention. However, the present invention may be modified in various different forms, and is not limited to the exemplary embodiments described herein. A part irrelevant to the description will be omitted in the drawings to clearly describe the present invention, and the same elements will be designated by the same reference numerals throughout the specification.

Terms used in the present specification will be briefly described, and the present invention will be described in detail.

As the terms used in the present invention, general terms, which are currently and widely used in consideration of a function in the present invention, have been selected, but may be changed according to the intentions of those skilled in the art or judicial precedents, appearance of new technology, or the like. Further, in a specific case, there is a term randomly selected by an applicant, and in this case, a meaning of the term will be described in detail in the corresponding description of the invention. Accordingly, the terms used in the present invention shall be defined based on the meaning of the term and the contents throughout the present invention, not the simple name of the term.

Throughout the specification, unless explicitly described to the contrary, the word "comprise" and variations such as "comprises" or "comprising", will be understood to imply the inclusion of stated elements but not the exclusion of any other elements.

The above description of the present invention is illustrative, and those skilled in the art to which the present invention pertains may understand that modifications to other particular forms may be easily made without changing the technical spirit or the essential feature of the present invention. Thus, it is to be appreciated that the embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it is to be interpreted that the meaning and scope of the claims and all the changes or modified forms derived from the equivalents thereof come within the scope of the present invention.

A method of continuously manufacturing a display unit according to an exemplary embodiment of the present invention, which bonds polarizing film sheet pieces formed by cutting a roll-type optical film including a polarizing film including an adhesive layer, and a release film adhering to the adhesive layer so as to be peeled off into sheet pieces having a predetermined length to a panel to manufacture the display unit, includes a carrying operation of continuously carrying the optical film to a cutting position, a defect detecting operation of detecting a defect of the optical film before the optical film is carried to the cutting position, a defective area extracting operation of extracting a defective area based on the detected defect among n unit examination areas, which are formed by dividing a distance corresponding to a length of the sheet piece from a first slit line forming position formed in the optical film into n equal parts (n>1), a slit line forming position determining operation of determining a position, at which a second slit line traversing the optical film in an orthogonal direction with respect to a carrying direction of the optical film needs to be formed, based on the extracted defective area and the first slit line forming position, a slit line forming operation of forming a second slit line from an opposite side to the release film to a depth reaching a surface of the adhesive layer side of the release film at the cutting position, based on the position, at which the second slit line needs to be formed, a sheet piece determining operation of determining whether the sheet piece of the optical film divided by the first slit line and the second slit line is a defective sheet piece including the defective area or a normal sheet piece including no defective area, a peeling operation of peeling the normal sheet piece determined in the sheet piece determining operation from the release film, and a bonding operation of supplying the panel to a bonding position so that a position of the panel is accord with the normal sheet piece carried to the bonding position, and bonding the normal sheet piece and the panel.

According to the method of continuously manufacturing the display unit according to the exemplary embodiment of the present invention, it is possible to improve a yield of the display unit by excluding a defective sheet piece, and increase a manufacturing speed of the display unit, thereby improving productivity of the display unit.

The roll-type optical film including the adhesive layer, the polarizing film, and the release film may have a width corresponding to a long side or a short side of the panel. For example, the display unit may be manufactured by bonding the sheet pieces of the polarizing film formed by cutting the roll-type optical film having a width corresponding to the long side of the panel into sheet pieces having a predetermined length to one surface of the panel, and by bonding the sheet pieces of the polarizing film formed by cutting the roll-type optical film having a width corresponding to the short side of the panel into sheet pieces having a predetermined length to the other surface of the panel.

According to the exemplary embodiment of the present invention, the optical film passes through the defect detecting operation of detecting a defect of the optical film before being carried to the cutting position.

In order to manufacture the display unit, the optical film, in which a mark indicating a position of the defect of the polarizing film is assigned in advance, may be used. The mark representing a defect of a surface and an inner surface of the polarizing film may be assigned to a surface of the polarizing film, a surface protective film, or the release film configuring the optical film. A difference between coordinates of the position (a center of the mark), to which the mark is assigned, and coordinates of the position of the defect may be preferably within ±200 mm, more preferably, within ±100 mm, further more preferably within ±50 mm, and most preferably within ±10 mm.

It is possible to improve a yield of the display unit by accurately and rapidly detecting the mark assigned to the optical film. It is possible to improve mark detection preciseness by adjusting a shape, a thickness, an optical density, a surface treatment state, and the like of the mark.

The shape of the mark assigned to the optical film may have, for example, a circular shape, an elliptical shape, a square shape, a rectangular shape, and a triangular shape, but the shape of the mark is not limited. However, the shape of the mark may be set to a simple geometric shape. When the mark is detected based on a difference in an intensity of light irradiated from a light source to the mark and a neighboring area of the mark, in order to improve mark detection preciseness, the mark having a shape, such as a circular shape, an elliptical shape, a square shape, a rectangular shape, a polygonal shape, and a triangular shape, entirely painted with ink may be assigned.

The optical film, to which the mark is assigned, may be wound and processed in the roll type. When the mark assigned to the optical film has a predetermined thickness or more, the optical film is transformed due to the thickness of the mark when the optical film is wound, so that there is a high possibility in that a new defect is generated. Accordingly, in order to prevent the transformation, a thickness of the mark may be preferably 1.5 µm or less, and more preferably, 1.0 µm or less. The mark may be assigned to the optical film by using, for example, a marker or an inkjet method.

In the defect detecting operation according to the exemplary embodiment of the present invention, the defect may be identified by obtaining a difference in a light intensity between reflective light, which is reflected from the defect and enters a light detecting device, or transmitted light, which passes through the defect and enters the light detecting device, in light emitted from the light source to the optical film, and reflective light, which is reflected from a portion other than the defect and enters the light detecting device, or transmitted light, which passes through a portion other than the defect and enters the light detecting device, in light emitted from the light source to the optical film.

The light emitted from the light source is irradiated to the defect on the optical film and the optical film around the defect. A part of the irradiated light may be absorbed by the defect, and the remaining part is not absorbed by the defect, and passes through the optical film and is incident to the light detecting device. The light incident to the light detecting device is converted into an electric signal according to the light intensity by a photographing device, so that images of the defect and the portion around the defect are converted into electric signals and transmitted to a control device. The control device may convert information according to the light intensities of the defect and the portion around the defect into a black and white gray.

The control device may calculate a difference between a gray of the portion having the defect and a gray of the portion of the optical film having no defect. The light emitted from the light source may be absorbed by the defect present on the optical film, so that light, which passes through the defect portion and is incident to the light detecting device, may be weak. In the meantime, the light emitted from the light source mostly passes through the optical film in the portion of the optical film having no defect, so that the intensity of light, which passes through the portion and is incident to the light detecting device, may be larger than the intensity of light passing through the defective portion.

A difference in a gray is generated between the defective portion and the portion around the defective portion by the difference between the intensity of light passing through the defective portion and the intensity of light passing through the portion around the defect, and it is possible to determine the existence of the defect, a size of defect, the number of defects, and the like in a predetermined area of the optical film by using the difference in the gray.

It is possible to determine the existence of the defect on the optical film, a size of defect, the number of defects, and the like by using a difference between the intensity of light, which is emitted from the light source and is reflected by the defective portion, and the intensity of light, which is emitted from the light source and is reflected by the portion of the optical film having no defect.

Further, it is possible to manufacture the display unit by using the optical film, to which the mark indicating the position of the defect of the polarizing film is assigned in advance. The mark assigned to the optical film may be detected by using the same method as the method of detecting the defect in the defect detecting operation. Accordingly, according to the exemplary embodiment of the present invention, it is possible to extract a defective area in the unit examination area by detecting the mark on the optical film and a defect, to which the mark is not assigned.

FIG. 1 is a diagram illustrating an optical film, in which n unit examination areas are formed, according to an exemplary embodiment of the present invention.

According to the exemplary embodiment of the present invention, a defective area is extracted based on a detected defect from n unit examination areas, which are formed by dividing a distance corresponding to a length of the sheet piece from a first slit line forming position formed in the optical film into n equal parts (n>1).

As the unit examination area, for example, n unit examination areas may be formed in the optical film, which is bonded to one surface of the panel and has a width corresponding to the short side of the panel, by dividing a distance corresponding to a length of a long side of the normal sheet piece from the first slit line forming position formed in the optical film into n equal parts (n>1). Further, m unit examination areas may be formed in the optical film, which is bonded to the other surface of the panel and has a width corresponding to the long side of the panel, by dividing a distance corresponding to a length of a short side of the normal sheet piece from the first slit line forming position formed in the optical film into m equal parts (m>1).

Referring to FIG. 1, the n unit examination areas are formed in the portion of the optical film from the first slit line by a distance corresponding to the length of the sheet piece. For example, the unit examination area divided by the first slit line and a first boundary line may be set as a first unit examination area, and the unit examination area divided by an n–1$^{th}$ boundary line and an n$^{th}$ boundary line may be set as an n$^{th}$ unit examination area. Accordingly, for each of the first unit examination area to the n$^{th}$ unit examination area, it is possible to extract the defective area based on the defect detected in the defect detecting operation.

In the defective area extracting operation according to the exemplary embodiment of the present invention, the unit examination area violating a predetermined reference condition may be extracted as the defective area, and the reference condition may be at least one of the existence of the defect, a size of defect, the number of defects, and the like.

For each of the first unit examination area to the n$^{th}$ unit examination area formed on the optical film, it is possible to extract the unit examination area violating the reference condition as the defective area by comparing the information on the defect detected in the defect detecting operation and the predetermined reference condition.

For example, when the existence of the defect is set as the reference condition of the defective area, in the defective area extracting operation, the unit examination area including the defect among the first to n$^{th}$ unit examination areas may be extracted as the defective area. When the defect is included in the plurality of unit examination areas, each of the plurality of unit examination areas including the defects may be extracted as the defective area.

Further, a size of defect may be set as the reference condition of the defective area. For example, the unit examination area including the defect having a size of 10 mm$^2$ or more may be extracted as the defective area. As the reference condition of the defective area, a size of defect may be set to preferably 1,000 mm$^2$, more preferably, 100 mm$^2$, and further more preferably 10 mm$^2$.

The number of defects may be set as the reference condition of the defective area. For example, the unit examination area including 120 defects or more may be extracted as the defective area. As the reference condition of the defective area, the number of defects may be set to preferably 12, more preferably, 3, and further more preferably 1.

The size of defect and the number of defects may be set as the reference condition of the defective area. For example, the size of defect is set to 100$^{mm2}$, and the number of defects is set to 12, and when one or more defects having a size of 100 mm$^2$ or more are included in the unit examination area, the corresponding unit examination area may be extracted as the defective area, and when 12 or more defects having a size less than 100 mm$^2$ are included in the unit examination area, the corresponding unit examination area may be extracted as the defective area. Further, the kind of defect may be set as the reference condition of the defective area. However, the reference conditions of the defective area are simply illustrative, and do not limit the reference condition.

Further, the reference condition of the defective area may be differently set for the optical film bonded to one surface of the panel and the optical film bonded to the other surface of the panel. The reference condition of the defective area for the optical film bonded to a viewing side surface of the panel, which a user views, in the manufactured display unit may be more strictly set than the reference condition of the defective area for the optical film bonded to an opposite side of the viewing side of the panel. For example, when the size of defect is set as the reference condition of the defective area, the unit examination area including the defect having a size of 10 mm$^2$ or more may be extracted as the defective area in the optical film bonded to the viewing side surface of the panel, and the unit examination area including the defect having a size of 50 mm$^2$ or more may be extracted as the defective area in the optical film bonded to the opposite side of the viewing side of the panel.

Accordingly, the reference condition of the defective area is variously set in the defective area extracting operation, so that it is possible to improve a product quality of the display unit by precisely excluding the polarizing film having the defect, and manufacture the display unit conforming to various conditions required by customers.

FIGS. 2A to 2E are diagrams illustrating a determination of a position, at which a second slit line needs to be formed on the optical film, according to an exemplary embodiment of the present invention.

According to the exemplary embodiment of the present invention, in the slit line forming position determining operation, a position, in which a second slit line traversing the optical film in an orthogonal direction to a carrying direction of the optical film needs to be formed, is determined based on the defective area extracted in the defective area extracting operation and the first slit line forming position. The second slit line is formed on the optical film so as to be parallel to the first slit line.

When one or more areas among the n unit examination areas are extracted as the defective areas in the defective area extracting operation, a boundary line at an upstream side of the extracted defective area may be determined as the position, at which the second slit line needs to be formed. Hereinafter, for convenience of description, the present invention will be described in detail based on the optical film, in which four unit examination areas are formed by dividing a distance corresponding to a length of the sheet piece from the first slit line forming position into four equal parts.

Figure 2A:
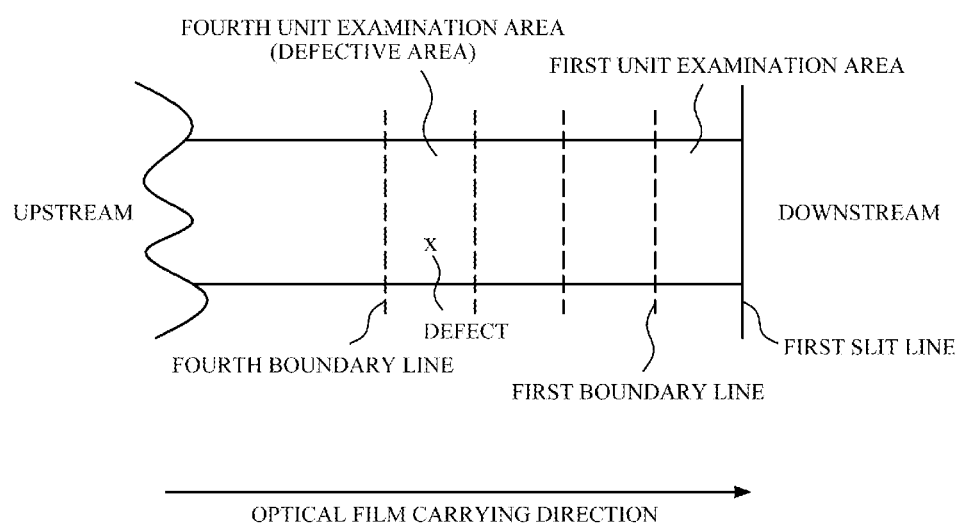
FIGS. 2A to 2E are diagrams illustrating a determination of a position, at which a second slit line needs to be formed on the optical film, according to an exemplary embodiment of the present invention.
Figure 2B:
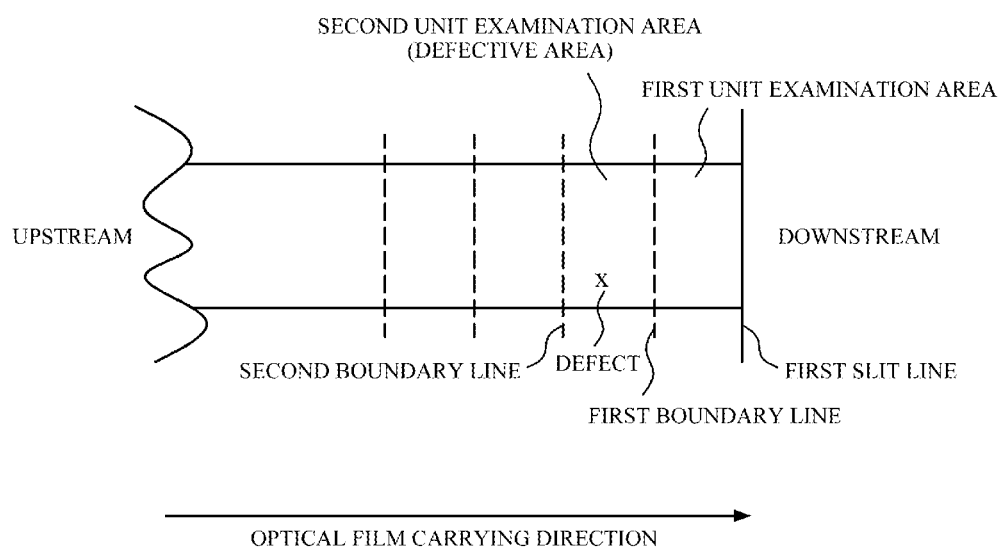

Referring to FIG. 2A, when a fourth unit examination area among the four unit examination areas is extracted as the defective area, a fourth boundary line that is a boundary line at an upstream side of the fourth unit examination area may be determined as the position, at which the second slit line needs to be formed. Further, referring to FIG. 2B, when a second unit examination area is extracted as the defective area, a second boundary line corresponding to a boundary line at an upstream side of the second unit examination area may be determined as the position, at which the second slit line needs to be formed.

Figure 2C:
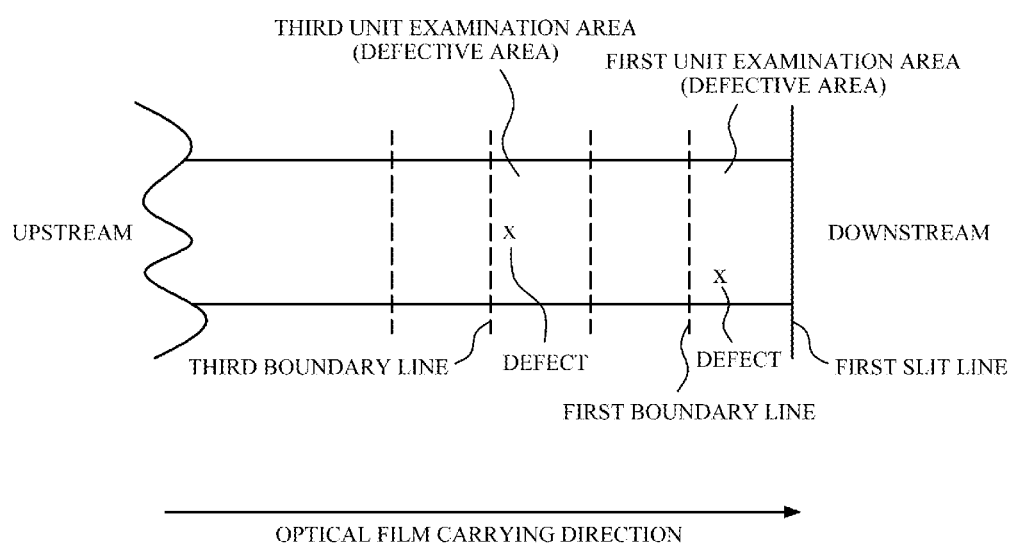
Figure 2D:
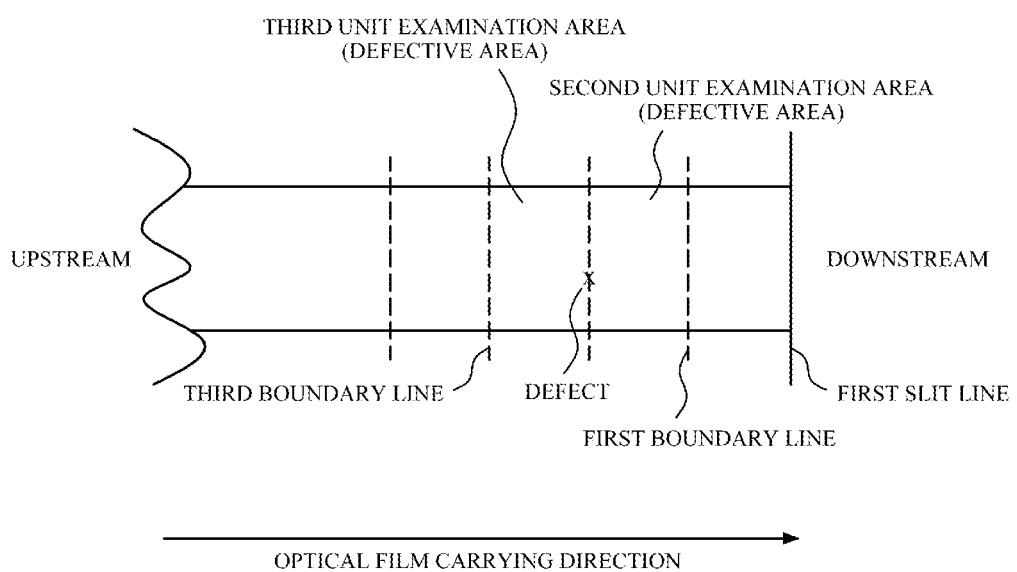

Referring to FIG. 2C, when a first unit examination area and a third unit examination area among the four unit examination areas are extracted as the defective areas, a first boundary line corresponding to a boundary line at an upstream side of the first unit examination area may be determined as the position, at which the second slit line needs to be formed, and a third boundary line corresponding to a boundary line at an upstream side of the third unit examination area may be determined as the position, at which the next second slit line needs to be formed. That is, after the slit line is formed in the first boundary line, and then the next slit line may be formed in the third boundary line.

Further, when one or more areas among the n unit examination areas are extracted as the defective areas, a boundary line at an upstream side of the extracted defective area existing at an upstream side of the carrying direction of the optical film may be determined as the position, at which the second slit line needs to be formed.

Referring to FIG. 2C, when the first unit examination area and the third unit examination area among the four unit examination areas are extracted as the defective areas, the third boundary line that is the boundary line at an upstream side of the third unit examination area existing at the upstream side of the carrying direction of the optical film may be determined as the position, at which the second slit line needs to be formed. Further, referring to FIG. 2D, when the defect is assigned over the boundary line between the second unit examination area and the third unit examination area, and the second unit examination area and the third unit examination area are detected as the defective areas, the third boundary line of the third unit examination area existing at the upstream side of the carrying direction of the optical film may be determined as the position, at which the second slit line needs to be formed.

When the plurality of defective areas are extracted in the unit examination areas, the boundary line at the upstream side of the extracted defective area existing at the upstream side of the carrying direction of the optical film is determined as the position, at which the second slit line needs to be formed, so that it is possible to simultaneously exclude the plurality of defective areas including the defects.

Further, the position, at which the second slit line needs to be formed, is determined based on the unit examination areas divided with the predetermined equal intervals, so that it is possible to easily apply the method to the process of manufacturing the display unit, which carries the optical film in the unit of a pitch, and it is possible to simplify an operation of determining the position, at which the second slit line needs to be formed, thereby improving a manufacturing speed of the display unit.

According to the exemplary embodiment of the present invention, when the defective area is not extracted in the n unit examination areas in the defective area extracting operation, a boundary line at an upstream side of the unit examination area existing at the upstream side of the carrying direction of the optical film may be determined as the position, at which the second slit line needs to be formed.

Figure 2E:
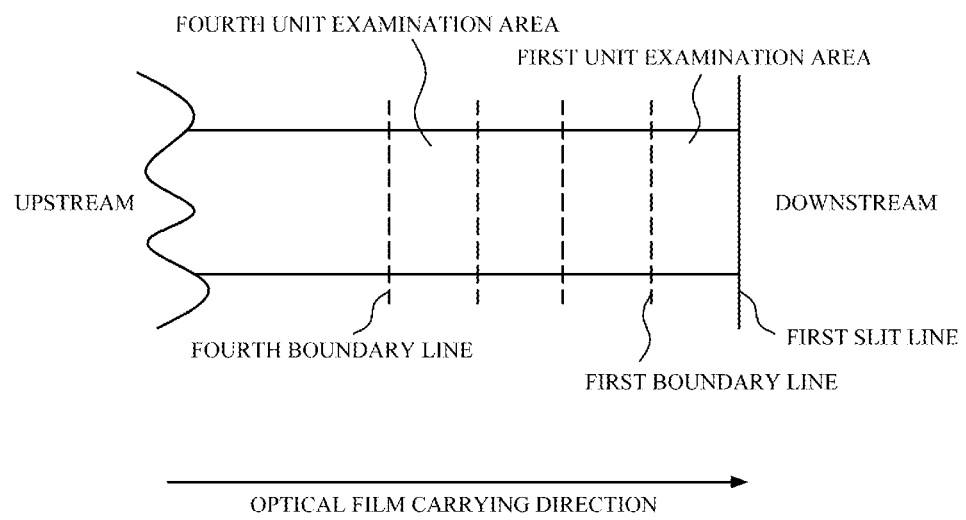

Referring to FIG. 2E, when the defective area is not extracted in the four unit examination areas, the fourth boundary line corresponding to the boundary line at the upstream side of the fourth unit examination area existing at the upstream side of the carrying direction of the optical film may be determined as the position, at which the second slit line needs to be formed.

Figure 3:
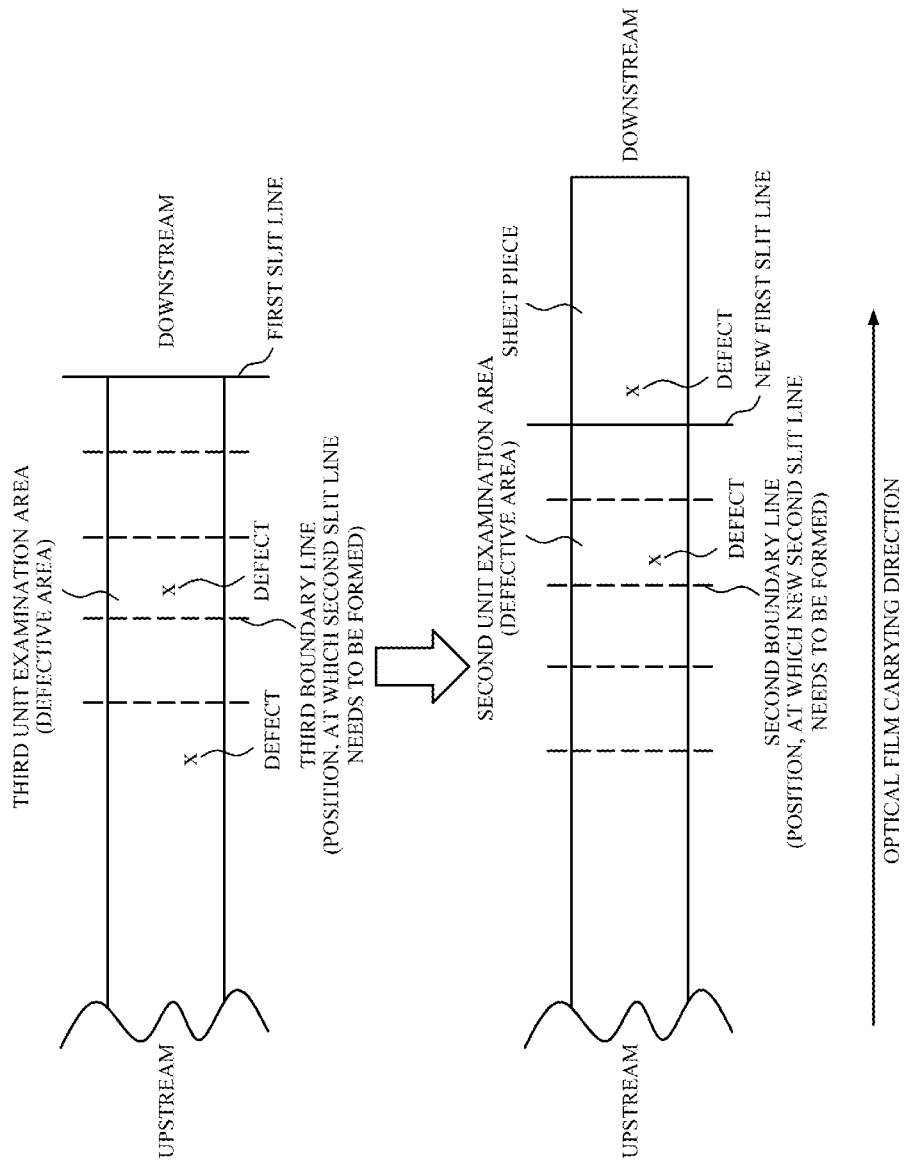
FIG. 3 is a diagram illustrating a setting of a first slit line on the optical film, according to an exemplary embodiment of the present invention.

FIG. 3 is a diagram illustrating a setting of the first slit line on the optical film, according to an exemplary embodiment of the present invention.

According to the exemplary embodiment of the present invention, when the second slit line is formed on the optical film based on the position, at which the second slit line needs to be formed, in the slit line forming operation, in the slit line forming position determining operation, the second slit line formed in the optical film may be set as a new first slit line, and a position, at which a new second slit line needs to be formed, may be determined based on the new first slit line.

When the roll-type optical film is continuously carried to a cutting position while being unwound and a leading end of the optical film wound in the roll type reaches the cutting position, the leading end of the optical film may be treated as the first slit line formed on the optical film. When the leading end of the optical film is treated as the first slit line, the position, at which the second slit line needs to be formed, may be determined based on the first slit line.

Referring to FIG. 3, the third boundary line of the third unit examination area extracted as the defective area based on the first slit line forming position is determined as the position, at which the second slit line needs to be formed, and the slit line is formed at the position, at which the second slit line needs to be formed, at the cutting position. Then, as illustrated in FIG. 3, the sheet piece formed by the first slit line and the second slit line may be carried to a downstream side of the carrying direction of the optical film, and the second slit line may be set as the new first slit line, so that the position, at which the new second slit line needs to be formed, may be determined based on the new first slit line.

According to the exemplary embodiment of the present invention, a length of a single area among the unit examination areas may be 10 to 2,500 mm.

A length of a single area in the n unit examination areas formed in the optical film may be 10 to 2,500 mm, preferably, 100 to 2,000 mm, more preferably, 200 to 1,500 mm, and further more preferably, 500 to 1,000 mm. It is possible to minimize the portion of the polarizing film, which includes the defect and is discarded, by adjusting a length of the unit examination area, thereby decreasing manufacturing cost of the display unit.

Figure 4:
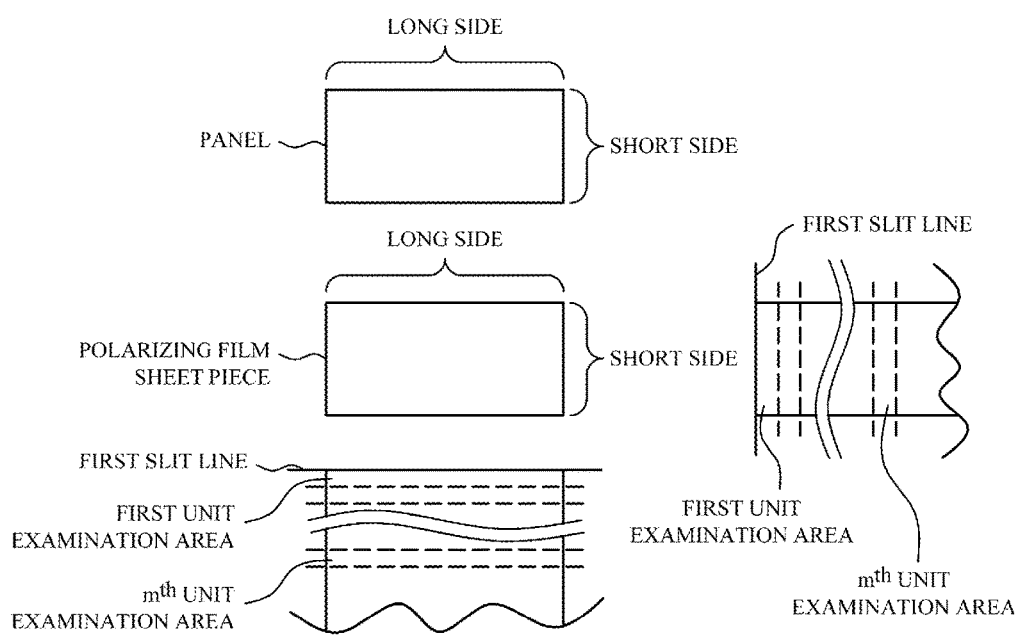
FIG. 4 is a diagram illustrating a unit examination area formed in the optical film bonded to one surface or the other surface of a panel according to an exemplary embodiment of the present invention.

FIG. 4 is a diagram illustrating the unit examination area formed in the optical film bonded to one surface or the other surface of the panel according to an exemplary embodiment of the present invention.

According to the exemplary embodiment of the present invention, the number n of unit examination areas, which are formed by dividing a distance corresponding to the length of the long side of the normal sheet piece from the first slit line forming position formed in the optical film bonded to one surface of the panel into n equal parts (n>1) may be different from the number m of unit examination areas, which are formed by dividing a distance corresponding to the length of the short side of the normal sheet piece from the first slit line forming position formed in the optical film bonded to the other surface of the panel into m equal parts (m>1).

For example, the number n of unit examination areas formed on the optical film bonded to one surface of the panel may be different from the number m of unit examination areas formed on the optical film bonded to the other surface of the panel.

The number of defects included in the optical film supplied so as to be bonded to one surface of the panel may be different from the number of defects included in the optical film supplied so as to be bonded to the other surface of the panel, so that it is possible to decrease the amount of polarizing films which include the defect and are discarded by setting more unit examination areas for the optical film including more defects. The number of defects of the optical film may be obtained by counting the number of defects through an examination operation in a process of manufacturing the optical film.

According to the exemplary embodiment of the present invention, a length of a single area among the n unit examination areas, which are formed by dividing the distance corresponding to the length of the long side of the normal sheet piece from the first slit line forming position formed in the optical film bonded to one surface of the panel into n equal parts (n>1) may be equal to a length of a single area among the m unit examination areas, which are formed by dividing a distance corresponding to the length of the short side of the normal sheet piece from the first slit line forming position formed in the optical film bonded to the other surface of the panel into m equal parts (m>1).

The length of the single area among the unit examination areas formed on the optical film bonded to one surface of the panel is made be equal to the length of the single area among the unit examination areas formed on the optical film bonded to the other one surface of the panel, so that it is possible to efficiently and continuously manufacture the display unit, in which the optical film is carried in the unit of a pitch.

The method of continuously manufacturing the display unit according to the exemplary embodiment of the present invention may further include an operation of preventing the defective sheet piece determined in the sheet piece determining operation from being bonded to the panel.

In the operation of preventing the defective sheet from being bonded to the panel, when the defective sheet piece formed on the optical film reaches an exclusion position, a portion of the optical film including the defective sheet piece is shifted to a dummy film carrying path and the defective sheet piece is bonded to the dummy film carrying path, thereby excluding the defective sheet piece from the carrying path of the optical film.

The optical film formed with the slit line in the slit line forming operation may be carried to the exclusion position located before the bonding position. The normal sheet piece and the defective sheet piece of the polarizing film formed by the slit line are laminated so as to be peeled off on the release film of the optical film carried to the exclusion position. The defective sheet piece determined in the sheet piece determining operation may be peeled from the release film at the exclusion position and excluded.

A defective sheet piece excluding device may be installed at the exclusion position, and the defective sheet piece excluding device may be attached with the defective sheet piece, which is laminated so as to be peeled off on the release film, and peel the defective sheet piece from the release film. The defective sheet piece peeled from the release film by the defective sheet piece excluding device may be excluded by a shifting device.

In the operation of preventing the defective sheet piece from being bonded to the panel according to the exemplary embodiment of the present invention, when the defective sheet piece formed on the optical film reaches the bonding position, the dummy film carrying path may be transmitted to the bonding position, the defective sheet piece may be bonded to the dummy film carrying path, and the defective sheet piece may be excluded from the carrying path of the optical film.

The defective sheet piece excluding device, which attaches the defective sheet piece laminated on the release film and peels the defective sheet piece from the release film, and the dummy film carrying path, which excludes the peeled defective sheet piece, may be formed to be adjacent to the bonding position. The defective sheet piece excluding device and the dummy film carrying path are interworked with a bonding device formed at the bonding position, and when the defective sheet piece is peeled from the release film by the defective sheet piece excluding device, the bonding device moves back from the bonding position and the dummy film carrying path moves forward to the bonding position, so that the defective sheet piece may be bonded to the dummy film carrying path and excluded from the carrying path of the optical film.

The method of continuously manufacturing the display unit according to the exemplary embodiment of the present invention may further include a measuring operation of measuring the quantity of carrying of the optical film and calculating distance measurement data based on the quantity of carrying.

The distance measurement data based on the quantity of carrying of the optical film may be calculated, and preciseness of the defect detection in the defect detecting operation may be improved by using the calculated distance measurement data.

Another exemplary embodiment of the present invention provides an apparatus for continuously manufacturing a display unit, which bonds polarizing film sheet pieces formed by cutting a roll-type optical film including a polarizing film including an adhesive layer, and a release film adhering to the adhesive layer so as to be peeled off into sheet pieces having a predetermined length to a panel to manufacture the display unit, the apparatus including: a carrying device, which continuously carries the optical film to a cutting position; a defect detecting device, which detects a defect of the optical film before the optical film is carried to the cutting position; a defective area extracting means, which extracts a defective area based on the detected defect among n unit examination areas, which are formed by dividing a distance corresponding to a length of the sheet piece from a first slit line forming position formed in the optical film into n equal parts (n>1); a slit line forming position calculating means, which determines a position, at which a second slit line traversing the optical film in an orthogonal direction with respect to a carrying direction of the optical film needs to be formed, based on the extracted defective area and the first slit line forming position; a slit line forming device, which forms a second slit line from an opposite side to the release film to a depth reaching a surface of the adhesive layer side of the release film at the cutting position, based on the position, at which the second slit line needs to be formed; a control means, which determines whether the sheet piece of the optical film divided by the first slit line and the second slit line is a defective sheet piece including the defective area or a normal sheet piece including no defective area; a peeling device, which peels the normal sheet piece determined by the control means from the release film; and a bonding device, which supplies a panel to a bonding position so that a position of the panel is accorded with the normal sheet piece carried to the bonding position, and bonds the normal sheet piece and the panel.

The apparatus for continuously manufacturing the display unit includes an optical film supplying device, which is mounted with the roll-type optical film and supplies the optical film, the carrying device, which continuously carries the optical film, a panel carrying device, which supplies the panel to the apparatus for continuously manufacturing the display unit, and an operation control device, which controls entire operations of the optical film supplying device and the panel carrying device.

The panel carrying device carries the panel to the bonding device by adjusting the panel with a predetermined interval and a predetermined speed by the operation control device.

The defect detecting device may include a light source, a light detecting device disposed at the same side as that of the light source of the optical film or disposed at an opposite side to the light source, and a control device receiving information from the light detecting device, and the control device may identify the defect by obtaining a difference in a light intensity between reflective light, which is reflected from the defect and enters the light detecting device, or transmitted light, which passes through the defect and enters the light detecting device, in light emitted from the light source to the optical film, and reflective light, which is reflected from a portion other than the defect and enters the light detecting device, or transmitted light, which passes through a portion other than the defect and enters the light detecting device, in light emitted from the light source to the optical film.

As the light source, a light source emitting visible rays, and a light source emitting ultraviolet rays or infrared rays may be used. The light detecting device may include a lens and a photographing device, such as a CCD or a CMOS, and may detect at least one of visible rays, ultraviolet rays, and infrared rays according to the kind of light source. The control device may receive information from the light detecting device, calculate a difference between a gray of the portion having the defect and a gray of the portion of the optical film having no defect, and calculate defect information, such as the existence of the defect, a size of defect, the number of defects, and the like in a predetermined area of the optical film. The defect information calculated by the control device is stored in a memory device, and the defect information is transmitted from the memory device to the defective area extracting means.

The light source may be positioned at a lower surface of the optical film, and the light detecting device may be positioned at the lower surface or an upper surface of the optical film. The control device may be integrally formed with the light detecting device.

The defective area extracting means according to another exemplary embodiment of the present invention extracts a defective area based on a detected defect from n unit examination areas, which are formed by dividing a distance corresponding to a length of the sheet piece from a first slit line forming position formed in the optical film into n equal parts (n>1).

The defective area extracting means may determine whether the unit examination area corresponds to the defective areas by using the defect information calculated by the control device of the light detecting device. The defective area extracting means may compare and calculates a predetermined reference condition and the defect information, and extract the unit examination area, which violates the reference condition and includes the defect, as the defective area. Information on the defective area extracted by the defective area extracting means is stored in the memory device, and is transmitted from the memory device to the slit line forming position calculating means.

The slit line forming position calculating means according to another exemplary embodiment of the present invention determines a position, in which a second slit line traversing the optical film in an orthogonal direction to a carrying direction of the optical film needs to be formed, based on the extracted defective area and the first slit line forming position. The slit line forming position calculating means determines the position, at which the second slit line needs to be formed, on the optical film by using the information on the defective area calculated by the defective area extracting means.

When one or more areas among the n unit examination areas are extracted as the defective areas by the defective area extracting means, the slit line forming position calculating means may determine a boundary line at an upstream side of the extracted defective area as the position, at which the second slit line needs to be formed. Further, when the defective area is not extracted in the n unit examination areas by the defective area extracting means, the slit line forming position calculating means may determine a boundary line at an upstream side of the unit examination area existing at the upstream side of the carrying direction of the optical film as the position, at which the second slit line needs to be formed.

Information on the slit line forming position generated by the slit line forming position calculating means may be stored in the memory device, and the information on the slit line forming position may be transmitted from the memory device to the slit line forming device and form the slit line in the optical film based on the information on the slit line forming position.

The slit line forming device forms the second slit line from an opposite side to the release film to a depth reaching a surface of the adhesive layer side of the release film at the cutting position, based on the position, at which the second slit line needs to be formed. That is, the slit line forming device half-cuts the optical film.

The slit line forming device forms the second slit line in the optical film by using information on the position, at which the second slit line needs to be formed, calculated by the slit line forming position calculating means. The slit line forming device may be formed at the cutting position, and may use, for example, a laser device or a cutter device.

The bonding device may include a pair of bonding rollers which bonds the normal sheet piece peeled from the release film to the panel.

The apparatus of continuously manufacturing the display unit according to another exemplary embodiment of the present invention may further include a measuring device, which measures the quantity of carrying of the optical film and calculates distance measurement data based on the quantity of carrying.

The above description of the present invention is illustrative, and those skilled in the art to which the present invention pertains may understand that modifications to other particular forms may be easily made without changing the technical spirit or the essential feature of the present invention. Thus, it is to be appreciated that the embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A method of continuously manufacturing a display unit, wherein the method bonds a polarizing film sheet piece to a panel to manufacture the display unit, wherein the polarizing film sheet piece is formed in a predetermined length by cutting a roll-type optical film, the optical film including a polarizing film having an adhesive layer, and a release film which adheres to the adhesive layer so as to be peeled therefrom, the method comprising:

continuously carrying the optical film to a cutting position;

detecting a defect of the optical film before the optical film is carried to the cutting position;

extracting a defective area based on the detected defect among n unit examination areas, which are formed by dividing a distance corresponding to a length of the sheet piece from a first slit line forming position formed in the optical film into n equal parts (n>1);

determining a position, at which a second slit line traversing the optical film in an orthogonal direction with respect to a carrying direction of the optical film is to be formed, based on the extracted defective area and the first slit line forming position;

forming a second slit line from an opposite side to the release film to a depth reaching a surface of the adhesive layer side of the release film at the cutting position, based on the position, at which the second slit line is to be formed;

deciding on whether the optical film sheet piece defined by the first slit line and the second slit line is a defective sheet piece including the defective area or a normal sheet piece including no defective area;

peeling from the release film the normal sheet piece decided in said deciding; and supplying the panel to a bonding position so that a position of the panel is aligned with the normal sheet piece carried to the bonding position, and bonding the normal sheet piece and the panel.

2. The method of claim 1, in the determining of slit line forming position, when at least one area among the n unit examination areas are extracted as the defective areas in the extracting a defective area, a boundary line at an upstream side of the extracted defective area is determined as the position, at which the second slit line needs to be formed.

3. The method of claim 1, in the determining of slit line forming position, when the defective area is not extracted in the n unit examination areas in the extracting a defective area, a boundary line at an upstream side of the unit examination area existing at an upstream side of a carrying direction of the optical film is determined as the position, at which the second slit line needs to be formed.

4. The method of claim 1, in the determining of slit line forming position, when the second slit line is formed on the optical film based on the position, at which the second slit line needs to be formed, the second slit line formed in the optical film is set as a new first slit line, and a position, at which a new second slit line needs to be formed, is determined based on the new first slit line.

5. The method of claim 1, in the detecting a defect, the defect is identified by obtaining a difference in a light intensity between reflective light, which is reflected from the defect and enters a light detecting device, or transmitted light, which passes through the defect and enters the light detecting device, in light emitted from the light source to the optical film, and reflective light, which is reflected from a portion other than the defect and enters the light detecting device, or transmitted light, which passes through a portion other than the defect and enters the light detecting device, in light emitted from the light source to the optical film.

6. The method of claim 1, in the extracting of a defective area, the defective area is extracted as the unit examination area violating a predetermined reference condition as the defective area.

7. The method of claim 6, wherein the reference condition is at least one of the existence of the defect, a size of defect, the number of defects.

8. The method of claim 1, wherein a length of a single area among the n unit examination areas is 10 to 2,500 mm.

9. The method of claim 1, wherein the number n of unit examination areas, which are formed by dividing a distance corresponding to a length of a long side of the normal sheet piece from the first slit line forming position formed in the optical film bonded to one surface of the panel into n equal parts (n>1) is different from the number m of unit examination areas, which are formed by dividing a distance corresponding to a length of a short side of the normal sheet piece from the first slit line forming position formed in the optical film bonded to the other surface of the panel into m equal parts (m>1).

10. The method of claim 1, wherein a length of a single area among the n unit examination areas, which are formed by dividing the distance corresponding to the length of the long side of the normal sheet piece from the first slit line forming position formed in the optical film bonded to one surface of the panel into n equal parts (n>1) is equal to a length of a single area among the m unit examination areas, which are formed by dividing a distance corresponding to the length of the short side of the normal sheet piece from the first slit line forming position formed in the optical film bonded to the other surface of the panel into m equal parts (m>1).

11. The method of claim 1, further comprising:
preventing the defective sheet piece decided in said deciding from being bonded to the panel.

12. The method of claim 11, in the preventing of the defective sheet from being bonded to the panel, when the defective sheet piece formed on the optical film reaches an exclusion position, the defective sheet piece is excluded from the carrying path of the optical film by shifting a portion of the optical film including the defective sheet piece to a dummy film carrying path and bonding the defective sheet piece to the dummy film carrying path.

13. The method of claim 11, in the preventing of the defective sheet from being bonded to the panel, when the defective sheet piece formed on the optical film reaches a bonding position, the defective sheet piece is excluded from the carrying path of the optical film by transmitting the dummy film carrying path to the bonding position, bonding the defective sheet piece to the dummy film carrying path.

14. An apparatus for continuously manufacturing a display unit, which bonds a polarizing film sheet piece to a panel to manufacture the display unit, wherein the polarizing film sheet piece is formed in a predetermined length by cutting a roll-type optical film, the optical film including a polarizing film having an adhesive layer, and a release film which adheres to the adhesive layer so as to be peeled therefrom, the apparatus comprising:

a carrying device, which continuously carries the optical film to a cutting position;

a defect detecting device, which detects a defect of the optical film before the optical film is carried to the cutting position;

a defective area extracting means, which extracts a defective area based on the detected defect among n unit examination areas, which are formed by dividing a distance corresponding to a length of the sheet piece from a first slit line forming position formed in the optical film into n equal parts (n>1);

a slit line forming position calculating means, which determines a position, at which a second slit line traversing the optical film in an orthogonal direction with respect to a carrying direction of the optical film is to be formed, based on the extracted defective area and the first slit line forming position;

a slit line forming device, which forms a second slit line up to a depth reaching a surface of the adhesive layer side of the release film from an opposite side to the release film at the cutting position, based on the position, at which the second slit line is to be formed;

a control means, which decides on whether the sheet piece of the optical film defined by the first slit line and the second slit line is a defective sheet piece including the defective area or a normal sheet piece including no defective area;

a peeling device, which peels the normal sheet piece decided by the control means from the release film; and a bonding device, which supplies the panel to a bonding position so that the panel is aligned with the normal sheet piece carried to the bonding position, and bonds the normal sheet piece and the panel.

15. The apparatus of claim 14, wherein when at least one areas among the n unit examination areas are extracted as the defective areas by the defective area extracting means, the slit line forming position calculating means determines a boundary line at an upstream side of the extracted defective area as the position, at which the second slit line needs to be formed.

16. The apparatus of claim 14, wherein when the defective area is not extracted in the n unit examination areas by the defective area extracting means, the slit line forming position calculating means determines a boundary line at an upstream side of the unit examination area existing at an upstream side of a carrying direction of the optical film as the position, at which the second slit line needs to be formed.

17. The apparatus of claim 14, wherein the defect detecting device includes a light source, a light detecting device disposed at the same side as a side of the light source of the optical film or disposed at an opposite side to the light source, and a control device receiving information from the light detecting device, and the control device identifies the defect by obtaining a difference in a light intensity between reflective light, which is reflected from the defect and enters the light detecting device, or transmitted light, which passes through the defect and enters the light detecting device, in light emitted from the light source to the optical film, and reflective light, which is reflected from a portion other than the defect and enters the light detecting device, or transmitted light, which passes through a portion other than the defect and enters the light detecting device, in light emitted from the light source to the optical film.

* * * * *